United States Patent [19]

Kamekura et al.

[11] Patent Number: 5,767,175
[45] Date of Patent: Jun. 16, 1998

[54] AQUEOUS COATING COMPOSITION

[75] Inventors: Yasuo Kamekura; Tomokuni Ihara; Kaoru Morita, all of Hiratsuka, Japan

[73] Assignee: Kansai Paint Company, Ltd., Amagasaki, Japan

[21] Appl. No.: 595,102

[22] Filed: Feb. 1, 1996

[30] Foreign Application Priority Data

Feb. 2, 1995 [JP] Japan .................. 7-015615

[51] Int. Cl.$^6$ .................. C08L 63/00; C08K 3/20; C08F 283/10

[52] U.S. Cl. .................. 523/403; 523/409; 525/107; 525/119; 525/481; 525/485; 525/530; 525/531; 525/930

[58] Field of Search .................. 523/409, 415, 523/403; 525/107, 119, 481, 485, 530, 531, 930

[56] References Cited

FOREIGN PATENT DOCUMENTS 145593  5/1994  Japan .

*Primary Examiner*—Randy Gulakowski
*Attorney, Agent, or Firm*—Donald W. Huntley

[57] ABSTRACT

An aqueous coating composition comprising an acrylic resin-modified epoxy resin (D), which is obtained by the reaction between a mixture of a bisphenol F based epoxy resin (A) and a bisphenol F based phenoxy resin (B) and an acrylic resin having carboxyl functionality (C), said acrylic resin-modified epoxy resin (D) being dispersed into water, preferably by using ammonia or amine, provides a composition with low viscosity, excellent storage stability and excellent application workability. In addition, the coating of the present invention can be applied to an interior surface and the resulting film has a smooth surface, excellent processability, excellent retorting resistant properties, excellent adhesion properties, and excellent corrosion resistant properties.

8 Claims, No Drawings

5,767,175

AQUEOUS COATING COMPOSITION

BACKGROUND OF THE INVENTION

1. Field of the Invention

This invention relates to an aqueous coating composition, and more specifically, to an aqueous coating composition which is easily and efficiently applied, is workable, and is capable of forming a complete and uniform surface coating. The surface coating obtained from the aqueous coating compositions of the present invention exhibits excellent corrosion resistance and satisfies a need for an improved coating for interior surfaces such as those found on the interior of beverage containers, food or soup cans.

2. Description of the Prior Art

Metallic cans produced from various known substrates such as tin plate, tin-free steel, aluminum and the like are widely used as containers for various beverages and foods. The interior surface of such metallic cans is generally treated with a thin protective layer of synthetic resin to prevent corrosion of the cans due to direct contact with the contents.

In the past, solvent-based epoxy based paints such as those containing epoxy/phenol resins or epoxy/acrylic resins have been widely used as a protective layer to coat the interior surface of metallic cans. While such epoxy based paints generally exhibit superior adhesion, corrosion resistance and flavor properties, they are inferior in processability. Solvent-based vinyl chloride resin based organosol paints are generally superior to epoxy based paints in terms of processability. However, these organosol paints are inferior in flavor properties due to large amounts of extractable components. Furthermore, the high concentration of organic solvent in these paints makes them undesirable from the standpoint of environmental, health, fire and safety considerations.

Many attempts have previously been made to cure the deficiencies discussed above.

Japanese Laid-Open Patent Application No. 145593/94 discloses an aqueous coating composition comprising an acrylic resin-modified resin, which is obtained by the reaction between a mixture of a bisphenol based epoxy resin and a bisphenol A based phenoxy resin and an acrylic copolymer having carboxyl functionality, and a resol phenol resin, said resins being dispersed into water by using ammonia or amine. It is claimed that the aqueous coating compositions disclosed in that publication provide improved processability and corrosion resistance. While this appears to be true, the application of the composition to the desired substrate is difficult because the viscosity of the paint is remarkably high, even at a low solids content. When an epoxy resin having a high molecular weight is used to reduce the viscosity of the paint, the resulting film is inferior in processability and corrosion resistance.

Canadian Laid-Open Patent Application No.1096530/81 discloses a method of preparing a coating by grafting a mixture of vinylic monomers having carboxyl functionality to an epoxy resin and/or phenoxy resin by using a free radical generator, neutralizing the resulting product with a base followed by dispersing into water. The aqueous coating composition obtained by that method contains, however, a large amount of acrylic resins which are unreacted with the epoxy resin and/or phenoxy resin. As a result, the workability of the composition upon application to a substrate is not good and the resulting film is inferior in processability and flavor properties.

The present inventors previously developed an aqueous coating composition, described in Japanese Laid-Open Patent Application No.256710/94, comprising an acrylic resin-modified epoxy resin. The resin is obtained by the reaction between a bisphenol based epoxy resin and an acrylic resin having carboxyl functionality, and a phenol-formaldehyde resin, the acrylic resin-modified epoxy resin being neutralized by ammonia and dispersed into water. While this aqueous coating composition has many advantages, the resulting film is inferior in processability and corrosion resistance in some applications.

Accordingly, a need remains for a composition for coating the interior of metallic cans that contain beverages or food products that sully satisfied the earlier deficiencies.

SUMMARY OF THE INVENTION

The present invention provides an aqueous coating composition which exhibits an excellent combination of processability and corrosion resistance, and which effectively solves the drawbacks found in the prior art.

Specifically, the present invention provides an aqueous coating composition comprising an acrylic resin-modified epoxy resin (D) which is the reaction product of (A) bisphenol F based epoxy resin, (B) bisphenol F based phenoxy resin, and (C) acrylic resin having carboxyl functionality, the acrylic resin-modified epoxy resin (D) being dispersed into water.

DETAILED DESCRIPTION OF THE INVENTION

The present coating compositions are based on an acrylic resin-modified epoxy resin which is the reaction product of (A) bisphenol F based epoxy resin, (B) bisphenol F based phenoxy resin, and (C) acrylic resin having carboxyl functionality. Each of these components is described below. For convenience in the description, the final acrylic resin-modified epoxy resin is designated (D).

BISPHENOL F BASED EPOXY RESIN (A)

The first component of the acrylic resin-modified epoxy resin is a bisphenol F based epoxy resin having an epoxy equivalent of about from 2,500 to 10,000, and preferably about from 2,600 to 6,000. The number-average molecular weight of this component, as measured by Gel Permeation Chromatography, is about from 5,000 to 12,000, preferably about from 6,000 to 10,000.

If the epoxy equivalent of the epoxy resin is lower than about 2,500, an acrylic resin-modified emulsion prepared from this component will exhibit unsatisfactory thixotropic properties, due to interactions between particles, while an epoxy resin having an epoxy equivalent higher than about 10,000 will cause poor storage stability of coating compositions prepared from this material.

If the number-average molecular weight of the epoxy resin is lower than about 5,000, coating compositions prepared from this material will exhibit inferior processability, while an epoxy resin having a number-average molecular weight higher than about 12,000 causes poor storage stability of the coating composition.

The bisphenol F based epoxy resin (A) can be obtained, for example, by reacting a bisphenol F based epoxy resin having a relatively low epoxy equivalent and a bisphenol F compound in the presence of an esterification catalyst such as tetraethylammonium bromide or an organic solvent at a temperature of about from 120 to 180° C. for a period of about from 2 to 10 hours so that the epoxy equivalent of the reaction product is in the range of about from 2,500 to 10,000.

Representative organic solvents which can be used in the reaction include, for example, ethers such as diethyl ether, dipropyl ether, dibutyl ether, ethyl vinyl ether, methoxytoluene, diphenyl ether, dioxane, propylene oxide, acetal, glycerin ether, tetrahydrofuran, 1,2-dimethoxyethane, cellosolve, methyl cellosolve, butyl cellosolve, methyl carbitol, 2-methoxyethanol, 2-ethoxyethanol, 2-isopropoxyethanol, 2-butoxyethanol, diethylene glycol, diethylene glycol monoethyl ether, diethylene glycol monobutyl ether, triethylene glycol monomethyl ether, 1-methoxy-2-propanol, 1-ethoxy-2-propanol and dipropylene glycol monomethyl ether; esters such as methyl acetate, ethyl acetate, propyl acetate, butyl acetate, isobutyl acetate, pentyl acetate, 3-methoxybutyl acetate, 2-ethylhexyl acetate, benzyl acetate, cyclohexyl acetate, methyl propionate, ethyl propionate, butyl propionate, dioctyl adipate, ethyl oxalate, diethyl malonate, esters of maleic acid, dibutyl tartrate, tributyl citrate, esters of sebacic acid, esters of phthalic acid, methylene glycol monoacetate, ethylene diacetate, cellosolve acetate, carbitol acetate, and ethyl acetoacetate.

Examples of the bisphenol F based epoxy resin having a relatively low epoxy equivalent that are commercially available include, for example, Epikote #806H (tradename of epoxy resin marketed by Yuka-Shell Epoxy Co.), Epototo YDF 170 (tradename of epoxy resin marketed by Toto Chemical Co.), and Epicron 830(S) (tradename of epoxy resin marketed by Dainippon Ink & Chemicals Co.).

BISPHENOL F BASED PHENOXY RESIN (B)

The second component of the acrylic resin-modified epoxy resin is a bisphenol F based phenoxy resin having a number-average molecular weight of about from 7,000 to 50,000, and preferably about from 12,000 to 40,000, and an epoxy equivalent higher than 25,000, preferably higher than 29,000.

If the number-average molecular weight of the phenoxy resin is lower than 7,000, it results in a coating film inferior in processability, while a phenoxy resin having a number-average molecular weight higher than 50,000 causes poor storage stability of the coating composition.

Examples of the bisphenol F based phenoxy resin (B) that are commercially available include, for example, Phenoxy BPF (tradename of phenoxy resin marketed by Yuka-Shell Epoxy Co.), and ZX-1395 (tradename of phenoxy resin marketed by Toto Chemical Co.).

ACRYLIC RESIN HAVING CARBOXYL FUNCTIONALITY (C)

The acrylic resin having carboxyl functionality (C) is an acrylic copolymer, which is obtained by copolymerizing a vinylic monomer having carboxyl functionality with other copolymerizable monomers. This resin should have have an acid value of about from 150 to 500, preferably about from 200 to 330. An acid value less than about 150 of resin (C) reduces the water-dispersibility of the emulsion and the solvent resistance of the coating film, while an acid value more than about 500 of resin (C) increases the viscosity of the acrylic resin (C) or the acrylic resin-modified epoxy resin (D) during manufacturing or reduces the water resistance of the coating film.

Examples of the vinylic monomer having carboxyl functionality which can be used in the present coating compositions include acrylic acid, methacrylic acid, crotonic acid, itaconic acid, maleic acid, fumaric acid and the like, and their acid anhydrides. Other copolymerizable monomers which can be used in the acrylic resin having carboxyl functionality (C) include, for example, styrene derivatives such as styrene, vinyltoluene, 2-methylstyrene, t-butylstyrene, and chlorostyrene; esters of (meth)acrylic acid such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, dodecyl (meth)acrylate and the like; vinylic monomers having hydroxyl functionality such as 2-hydroxyethyl (meth)acrylate, and hydroxypropyl (meth)acrylate; N-substituted (meth)acrylic monomers such as N-methylol (meth)acrylamide and N-(n-butoxymethyl)(meth)acrylamide. These monomers can be used singly or in combination.

In the present invention, the kind and content of the monomers mentioned above in the acrylic resin having carboxyl functionality (C) are not specifically limited, but it is generally desirable to use methacrylic acid as a vinylic monomer having carboxyl functionality in an amount of at least about 5% by weight, preferably about from 30 to 50% by weight, and styrene and ethyl acrylate as other copolymerizable monomers in an amount of at most 95% by weight, preferably about from 50 to 70% by weight.

The acrylic resin having carboxyl functionality (C) can be obtained by heating and copolymerizing a mixture of the vinylic monomer having carboxyl functionality and other copolymerizable monomers mentioned above in the presence of an organic solvent and a radical polymerization initiator such as azobisisobutyronitrile, benzoyl peroxide, t-butyl perbenzoate, and t-butyl peroxy-2-ethylhexanoate, at a temperature of about from 80 to 150° C. for a period of about from 1 to 10 hours.

While the number-average molecular weight of the resin having carboxyl functionality (C) is not specifically limited, it is desirable to be in the range of about from 5,000 to 20,000, preferably about from 10,000 to 18,000.

ACRYLIC RESIN-MODIFIED EPOXY RESIN (D)

In the preparation of the acrylic resin-modified epoxy resin (D), a mixture of epoxy resin (A) and phenoxy resin (B) is first prepared, and subsequently reacted with the acrylic resin having carboxyl functionality (C).

The mixture of epoxy resin (A) and phenoxy resin (B) is prepared from complemental quantities of about from 20 to 80 parts by weight of each component. Preferably epoxy resin (A) comprises about from 40 to 70 parts by weight of the mixture and phenoxy resin (B) comprises, complementally, about from 30 to 60 parts by weight. If the concentration of epoxy resin (A) in the mixture with phenoxy resin (B) is lower than about 20% by weight, it results in poor storage stability of the fianl coating composition; while a concentration of epoxy resin (A) in the mixture of higher than about 80% by weight often results in a coating film inferior in processability.

The acrylic resin-modified epoxy resin (D) is a reaction product between a mixture of the bisphenol F based epoxy resin (A) and the bisphenol F based phenoxy resin (B) and the acrylic resin having carboxyl functionality (C). The acrylic resin-modified epoxy resin (D) can be obtained by heating and reacting a mixture of the bisphenol F based epoxy resin (A) and the bisphenol F based phenoxy resin (B) and the acrylic resin having carboxyl functionality (C) in the presence of an organic solvent and an amine-based esterification catalyst at elevated temperatures, a temperature of about from 80 to 120° C. for a period of about from 1 to 10 hours. The organic solvent should be selected so as to be compatible with the bisphenol F based epoxy resin (A), the bisphenol F based phenoxy resin (B) and the acrylic resin-modified epoxy resin (D). Representative organic solvents which can be used include, for example, methoxypropanol, ethylene glycol monobutyl ether and n-butanol. Representative amine-based esterification catalysts which can be used include, for example, dimethylethanolamine, dimethylbenzylamine, ethanolamine, diethanolamine and morpholine.

The proportions of the bisphenol F based epoxy resin (A), the bisphenol F based phenoxy resin (B) and the acrylic resin having carboxyl functionality (C) used in the aforementioned reaction can be adjusted according to the performance characteristics desired in the aqueous coating composition and the film made from the coating composition. In general, the mixture of the epoxy resin (A) and the phenoxy resin (B) should represent about from 50 to 90 parts by weight, per 100 parts of the mixture of epoxy resin (A), phenoxy resin (B) and the acrylic resin having carboxyl functionality (C). The acrylic resin should complementally represent about from 10 to 50 parts by weight of the total mixture. Preferably, the mixture of epoxy resin (A) and phenoxy resin (B) is about from 70 to 90 parts, per 100 parts of the total mixture, in which case the acrylic resin having carboxyl functionality (C) represents, complementally, about from 10 to 30 parts by weight of the total mixture.

Preferably, the acrylic resin-modified epoxy resin (D) obtained by the aforementioned reaction has a number-average molecular weight of about from 6,000 to 40,000, an acid value of about from 15 to 60, and substantially no unreacted epoxy groups.

In the present invention, the aforementioned acrylic resin-modified epoxy resin (D) is neutralized by a neutralizing agent and dispersed in water. Representative examples neutralizing agents which can be used include, for example, ammonia; alkylamines such as monomethylamine, dimethylamine, trimethylamine, monoethylamine, diethylamine, triethylamine, monoisopropylamine, diisopropylamine, triisopropylamine, monobutylamine, dibutylamine, tributylamine and the like; alkanolamines such as monoethanolamine, dimethylethanolamine, diethanolamine, and aminomethylpropanol; and volatile amines such as morpholine. The neutralization degree is generally in the range of about from 0.4 to 1.0 equivalent per one equivalent of the carboxyl group in the acrylic resin-modified epoxy resin (D). The degree of neutralization can be adjusted to compensate for the water-dispersibility of the resin and the odor of the coating composition. If the degree of neutralization is less than about 0.4 equivalent, it results in poor storage stability of the final coating compositon., while a degree of neutralization of higher than about 1.0 equivalent causes odor in the composition.

The aqueous coating composition of the present invention can be prepared by a variety of techniques to neutralize the resin (D) and combine it with water. For example, resin (D) can first be neutralized using a neutralizing agent and the resulting neutralized resin can be poured into water to form an aqueous coating composition. In another method, water can be poured into neutralized resin to form an aqueous coating composition. In still another method, the resin can be poured into neutralizing agent containing water to form an aqueous coating composition. In still another method, neutralizing agent containing water can be poured into the resin to form an aqueous coating composition.

The aqueous coating composition of the present invention may optionally include per se known curing agents such as resol phenol resin and amino resin. However, it is preferable that the amount of these compounds be kept as small as possible, since they typically have an adverse effect on processability and can impart an undesired flavor.

The aqueous coating composition of the present invention may further include, for example, optional additives typically used in coating compositions, such as water-soluble or water-dispersible anionic resins, pigments, defoamers, lubricants and waxes.

While the solid content of the coating compositions of the present invention is not specifically limited, the desired solid content should be in the range of about 20% to about 45% by weight.

The aqueous coating compositions of the present invention can be applied to a wide variety of substrates. The compositions have particular advantages on metallic substrates such as tin plate, aluminum, tin-free steel, iron, zinc, galvanized sheet iron, and galvanized sheet alloy as well as phosphate-treated or chromate-treated metallic substrates. However, they can also be applied to non-metallic substrates such as wood, plastics and concrete. Known coating techniques can be used, such as bar coating, roll coating, spray coating, dip coating, electrostatic spray coating, and electrodeposition coating.

After application to a substrate, the resulting film is generally cured at elevated temperatures, for example, at a temperature of about from 150 to 300° C. for a period of about from 15 seconds to 30 minutes. The present coating compositions are generally applied so as to provide a film thickness of about from 3 to 20 microns after curing.

The aqueous coating compositions and the resulting coatings provide an excellent combination of processing and performance characteristics, which are believed to be due to the combination of components in the resin, and especially the bisphenol F based epoxy resin and the bisphenol F based phenoxy resin.

The present invention is explained more fully in the following Examples and Comparative Examples, in which parts and percentages are all by weight.

PRODUCTION OF BISPHENOL F BASED EPOXY RESIN

Component Preparation 1

A four-necked flask, equipped with a stirrer, cooling condenser, thermometer and nitrogen gas inlet tube, was charged with 2,400 parts of Epikote #806H (bisphenol F based epoxy resin marketed by Yuka-Shell Chemical Co., epoxy equivalent of about 167, molecular weight of about 340), 1,325 parts of bisphenol F and 1.44 parts of tetraethylammonium bromide; after which the resulting reactant mixture was kept at 140° C. under nitrogen. The reaction was traced by measuring both an epoxy equivalent and the viscosity of the solution, which was diluted with diethylene glycol monobutyl ether to 40%. After about 5 hours, a product was obtained and identified as a bisphenol F based epoxy resin (A-1) having an epoxy equivalent of 4,800, a 40% solution viscosity of Z2, a number-average molecular weight of 9,000 and a solid content of 100%.

Component Preparation 2 (for comparison.)

A four-necked flask equipped with a stirrer, cooling condenser, thermometer and nitrogen gas inlet tube was charged with 1,870 parts of Epikote #828 (bisphenol A based epoxy resin marketed by Yuka-Shell Chemical Co., epoxy equivalent of about 187, molecular weight of about 360), 1,046 parts of bisphenol A and 0.94 parts of tetraethylammonium bromide; after which the resulting reactant mixture was kept at 140° C. under nitrogen. The reaction was traced by measuring both an epoxy equivalent and the viscosity of the solution, which was diluted with diethylene glycol monobutyl ether to 40%. After about 5 hours a product was obtained and identified as bisphenol A based epoxy resin (A-2) having an epoxy equivalent of 3,800, a 40% solution viscosity of Z6, a number-average molecular weight of 6,000 and a solid content of 100%.

PRODUCTION OF ACRYLIC RESIN HAVING CARBOXYL FUNCTIONALITY

Component Preparation 3

A four-necked flask equipped with a stirrer, cooling condenser, thermometer and dropping funnel was charged with 522 parts of n-butanol and 300 parts of diethylene glycol monobutyl ether; followed by replacing the inner space with nitrogen gas and then heating to a temperature of 93° C. with agitation. Then, a mixture of 270 parts of methacrylic acid, 270 parts of styrene, 60 parts of ethyl acrylate and 18 parts of benzoyl peroxide was added dropwise over 3 hours. After the completion of this addition, 30 parts of n-butanol was added and the mixture was heated to a temperature of 100° C., after which the resulting reactant mixture was kept at 100° C. for 1 hour. After that, a mixture of 3 parts of benzoyl peroxide and 27 parts of n-butanol was added dropwise over 30 minutes and the mixture was kept at 100° C. for 2 hours.

The unreacted monomers and solvents were then removed under reduced pressure, n-butanol in the amount equal to that removed was added and the mixture was agitated for 30 minutes to obtain a solution of product identified as acrylic resin having carboxyl functionality (C-1) and having a solid content of 40%. The resin (solid content) had an acid value of 293 and a number-average molecular weight of 14,000 as determined by Gel Permeation Chromatography.

PRODUCTION OF AQUEOUS COATING COMPOSITION

Example 1

A four-necked flask equipped with a stirrer, cooling condenser, and thermometer was charged with 128 parts of epoxy resin (A-1) obtained in Component Preparation 1,255 parts of Phenoxy BPF solution (bisphenol F based phenoxy resin marketed by Yuka-Shell Chemical Co., methyl ethyl ketone solution having a solid content of 50%, epoxy equivalent of 40,000, viscosity of Z7, number-average molecular weight of 24,000) and 13 parts of acrylic solution (C-1) obtained in Component Preparation 3. The resulting reactant mixture was heated to a temperature of 85° C. After the mixture was dissolved, 4.8 parts of deionized water was added dropwise over 30 minutes, and then 6.0 parts of dimethylethanolamine was added followed by agitating for 2 hours. After that, 8.7 parts of dimethylethanolamine was added followed by agitating for 30 minutes, and then 670.5 parts of deionized water was added dropwise over 1 hour. The solvents in the mixture were removed under reduced pressure to obtain an aqueous coating composition (D-1) having a solid content of about 34%, a pH of 7.82, a viscosity (measured by Brookfield Viscometer at 60 rpm at 25° C.) of 180 cps and a particle size of 3.6 microns.

Examples 2 to 5 and Comparative Examples 1 to 3

The general procedure of Example 1 was repeated, except that the kind and amount of epoxy resin, phenoxy resin and neutralizing agent shown in Table I were used, to obtain aqueous coating compositions (D-2) to (D-8), respectively. The solid content, pH, viscosity and particle size of each aqueous coating composition obtained are also summarized in Table 1.

Notes for Table 1

(*1) BPF: Phenoxy BPF, mentioned above.

ZX: ZX-1395 solution, bisphenol F based phenoxy resin marketed by Toto Chemical Co., methyl ethyl ketone solution having a solid content of 50%, an epoxy equivalent of 31,250 and a number-average molecular weight of 7,900.

PKHH: PKHH solution, bisphenol A based phenoxy solution marketed by Union Carbide Co., methyl ethyl ketone solution having a solid content of 50%, an epoxy equivalent of 32,300 and a number-average molecular weight of 20,000.

(*2) DMEA: Dimethylethanolamine.

PRODUCTION OF PHENOL RESIN

Component Preparation 4

In a four-necked flask equipped with a stirrer, cooling condenser and thermometer, 108 parts of p-cresol, 216 parts of 37% aqueous formaldehyde and 160 parts of 25% aqueous sodium hydroxide were charged, carrying out the reaction for 2 hours at 50° C. and for further 1 hour at 100° C., neutralizing with hydrochloric acid and extracting with a 1:1 mixed solvents of n-butanol and xylene to obtain a phenol resin solution (E-1) having a solid content of 60% and an average number of methylol group of 1.9 (determined from IR spectrum).

EXAMPLES OF AQUEOUS COATING COMPOSITIONS

Application Example 1

A vessel was charged with 100 parts of aqueous composition (D-1) obtained in Example 1, 2 parts of phenol resin solution (E-1) obtained in Component Preparation 12, and 15 parts of deionized water, followed by dispersing for 30 minutes by means of a dissolver to obtain an aqueous coating composition.

Application Examples 2 to 5 and Comparative Application Examples 1 to 3

The general procedure of Application Example 1 was repeated, except that the aqueous compositions shown in Table 2 were used, to obtain aqueous coating compositions.

The aqueous coating compositions obtained in Application Examples 1–5 and Comparative Application Examples 1–3 were tested, and the results are summarized in Table 2.

TEST PROCEDURES

Application Workability

The aqueous coating compositions obtained in Application Examples and Comparative Application Examples were diluted with water to a viscosity of about 30 seconds (Fordcup #4) and coated onto an aluminum sheet having a thickness of 0.3 mm by use of a roll coater to a dry film weight of 120 mg/cm$^2$, followed by curing in an oven so that the temperature of the aluminum sheet reaches 260° C. at an atmospheric temperature of 280° C. and a wind velocity of 25 meters/minute for a period of 30 seconds. The surface of the film was evaluated for smoothness with an unaided eye according to the following criteria:

a: Excellent smoothness with no foaming over the entire film
b: Inferior smoothness with foam all over the film in an appreciable amount.

The test pieces thus obtained were subjected to the tests of processability, retorting resistance, adhesion and corrosion resistance.

Storage Stability.

The solid content of the aqueous coating composition was adjusted to be 30%, placed into a vessel, sealed and stored at 50° C. for 3 months. The resulting stored coating composition was evaluated according to the following criteria:

a: No caking or phase separation
b: Slight degree of caking, phase separation and agglomeration, Processability:

A coated plate was cut into a size of 40 mm×50 mm. The resulting test piece was folded into two equal parts in such a way that the film was outside and the bent portion became 40 mm. Three tin-free steel plates 0.23 mm in thickness were inserted into between the two parts of the test piece, and a 3-kg load was dropped on the bent portion of the test piece from a height of 42 cm. Then, a voltage of 6.5 V was applied between the two ends of the bent portion (2 cm width) for 6 seconds to measure the current value (mA). The processability was represented by the current value (mA). A smaller current value means excellent processability.

Retorting Resistance

A coated plate was treated at 125° C. for 30 minutes in an autoclave followed by dipping into water to evaluate a degree of blushing of the film by observation with the naked eye according to the following criteria:

a: No blushing
b: Remarkable degree of blushing.

Adhesion

Squares were formed by effecting 11 cuts respectively in length and width at about 1.5 mm intervals on a film of a test panel by using a knife. An adhesive cellophane tape having a width of 24 mm was adhered to the squares, followed by strongly peeling the tape to evaluate the adhesion properties of the squares according to the following criteria:

a: No peeling
b: Slight degree of peeling,

Corrosion Resistance

A coated plate was subjected to necking and flanging treatment and dipped into an aqueous solution containing 2% of malic acid, citric acid and sodium chloride, respectively, at a temperature of 50° C. for 5 days. After that, the coated piece was cut to open and the degree of corrosion was evaluated. The value 10 denotes no corrosion and the value 0 denotes remarkable degree of corrosion.

TABLE 1

|  | EXAMPLES | | | | | COMPARATIVE EXAMPLES | | |
| --- | --- | --- | --- | --- | --- | --- | --- | --- |
|  | 1 | 2 | 3 | 4 | 5 | 1 | 2 | 3 |
| Epoxy Resin Solution (part) | | | | | | | | |
| Kind | A-1 | A-1 | A-1 | A-1 | A-1 | A-1 | A-2 | A-1 |
| Amount | 128 | 188 | 128 | 128 | 128 | 255 | 128 | 128 |
| Phenoxy Resin Solution (part) (*1) | | | | | | | | |
| Kind | BPF | BPF | BPF | BPF | ZX | — | BPF | PKHH |
| Amount | 255 | 174 | 255 | 255 | 255 | — | 255 | 255 |
| Acrylic Resin Solution (part) | | | | | | | | |
| Kind | C-1 | C-1 | C-1 | C-1 | C-1 | C-1 | C-1 | C-1 |
| Amount | 113 | 113 | 113 | 113 | 113 | 113 | 113 | 113 |
| Neutralizing Agent (*2) | | | | | | | | |
| Kind | DMEA | DMEA | Ammonia | DMEA | DMEA | DMEA | DMEA | DMEA |
| Equivalent | 0.7 | 0.7 | 0.7 | 1.0 | 0.7 | 0.7 | 0.7 | 0.7 |
| Characteristics of Composition | | | | | | | | |
| Kind of Aqueous Composition | D-1 | D-2 | D-3 | D-4 | D-5 | D-6 | D-7 | D-8 |
| Solid Content (% by weight) | 34.0 | 34.2 | 34.1 | 33.8 | 34.1 | 33.9 | 34.2 | 34.3 |
| pH | 7.82 | 7.90 | 7.85 | 8.70 | 7.82 | 7.78 | 7.80 | 8.17 |
| Viscosity (cps) | 180 | 150 | 140 | 820 | 130 | 130 | 40.000 | 100.000 < |
| Particle Size (micron) | 0.36 | 0.26 | 0.33 | 0.29 | 0.35 | 0.25 | 0.37 | 0.38 |

TABLE 2

|  | Application Example | | | | | Comparative Application Example | | |
|---|---|---|---|---|---|---|---|---|
|  | 1 | 2 | 3 | 4 | 5 | 1 | 2 | 3 |
| Kind of Aqueous Composition | D-1 | D-2 | D-3 | D-4 | D-5 | D-6 | D-7 | D-8 |
| Application Workability | a | a | a | a | a | a | b | b |
| Storage Stability | a | a | a | a | a | a | a | b |
| Processability (mA) | 2 | 3 | 1 | 1 | 4 | 10 | 6 | 3 |
| Retorting Resistance | a | a | a | a | a | a | a | a |
| Adhesion | a | a | a | a | a | b | a | a |
| Corrosion Resistance | 10 | 9 | 10 | 10 | 8 | 3 | 8 | 8 |

We claim:

1. An aqueous coating composition comprising an acrylic resin-modified epoxy resin (D) which is the reaction product of (A) bisphenol F epoxy resin, (B) bisphenol F phenoxy resin, and (C) acrylic resin having carboxyl functionality, the acrylic resin-modified epoxy resin being dispersed into water.

2. An aqueous coating composition according to claim 1 wherein the epoxy resin (A) has an epoxy equivalent of about from 2,500 to 10,000.

3. An aqueous coating composition according to claim 1 wherein the phenoxy resin (B) has a number-average molecular weight of about from 7,000 to 50,000.

4. An aqueous coating composition according to claim 1 wherein the mixing ratio of the epoxy resin (A) to the phenoxy resin (B) is about from 20 to 80 parts by solid weight of the former to about from 20 to 80 parts by solid weight of the latter.

5. An aqueous coating composition according to claim 1 wherein the acrylic resin-modified epoxy resin is dispersed into water by using ammonia or amine.

6. An aqueous coating composition according to claim 1 wherein the acrylic resin having carboxyl functionality (C) has an acid value of about from 150 to 500.

7. An aqueous coating composition according to claim 1 wherein the mixing ratio of a mixture of the epoxy resin (A) and the phenoxy resin (B) to the acrylic resin having carboxyl functionality (C) is in the range of about from 50 to 90 parts by solid weight of the former to 10 to 50 parts by solid weight of the latter.

8. An aqueous coating composition according to claim 1 wherein the acrylic-resin-modified epoxy resin (D) has a number-average molecular weight of about from 6,000 to 40,000 and an acid value of about from 15 to 60.

* * * * *